United States Patent
Del Sordo

(10) Patent No.: US 11,314,707 B1
(45) Date of Patent: Apr. 26, 2022

(54) CONFIGURABLE DOMAIN MANAGER PLATFORM

(71) Applicant: Q2 Strategies, LLC, Charlotte, NC (US)

(72) Inventor: Michael Del Sordo, Howell, MI (US)

(73) Assignee: Q2 Strategies, LLC, Brighton, MI (US)

( * ) Notice: Subject to any disclaimer, the term of this patent is extended or adjusted under 35 U.S.C. 154(b) by 202 days.

(21) Appl. No.: 15/941,587

(22) Filed: Mar. 30, 2018

Related U.S. Application Data

(60) Provisional application No. 62/479,165, filed on Mar. 30, 2017.

(51) Int. Cl.
  G06F 16/22 (2019.01)
  G06F 16/25 (2019.01)
  G06F 16/951 (2019.01)
  H04L 67/1097 (2022.01)
  H04L 29/06 (2006.01)

(52) U.S. Cl.
  CPC ............ G06F 16/22 (2019.01); G06F 16/258 (2019.01); G06F 16/951 (2019.01); H04L 63/101 (2013.01); H04L 67/1097 (2013.01)

(58) Field of Classification Search
  CPC ...................................................... G06F 16/22
  See application file for complete search history.

(56) References Cited

U.S. PATENT DOCUMENTS

| | | | | |
|---|---|---|---|---|
| 2003/0078960 A1* | 4/2003 | Murren | ................... | H04L 29/06 709/203 |
| 2007/0239508 A1* | 10/2007 | Fazal | ................. | G06Q 10/0637 705/7.36 |
| 2008/0244517 A1* | 10/2008 | Rostoker | ................... | G06F 8/10 717/120 |
| 2016/0092180 A1* | 3/2016 | Straub | ..................... | G06T 11/60 715/762 |
| 2017/0140307 A1* | 5/2017 | Gottemukkala | ..... | G06Q 10/067 |

* cited by examiner

Primary Examiner — Dawaune A Conyers

(57) ABSTRACT

A configurable domain manager platform is described herein which provides for simplified extraction and handling of data from a variety of data sources and data formats.

20 Claims, 2 Drawing Sheets

CONFIGURABLE DOMAIN MANAGER PLATFORM

CROSS-REFERENCE TO RELATED APPLICATION

This application claims the benefit of U.S. Provisional Patent Application Ser. No. 62/479,165, filed Mar. 30, 2017, the entirety of which is incorporated herein by reference.

TECHNOLOGICAL FIELD

Example embodiments of the present invention relate generally to providing simplified and standardized access to data stored in a variety of persistent storage formats and, more particularly, to methods and apparatuses that provide ease of access to the data.

BACKGROUND

The inventors have discovered limitations with existing techniques for leveraging and extracting value from large amounts of data in large enterprises. Often, extracting the data into a usable form requires extensive time commitments, technology development, and knowledge of how to handle data for those seeking to use the data.

Through applied effort, ingenuity, and innovation, the inventors have solved many of these identified limitations by developing a solution that is embodied by the present invention and described in detail below.

SUMMARY

Large corporations and entities, such as financial institutions, collect, store, and handle large quantities of data in many different formats and data storage mediums. This large amount of data can provide useful insights into many different factors of business including analysis and development of future business products and processes.

In conventional systems, leveraging and extracting useful insights and value from large amounts of data consumes large amounts of time, human resources, and the use of multiple development systems. In many instances, those with the skill and knowledge to analyze and use the data for value cannot easily access the data in a timely and relevant fashion. Instead, data analysts or business users are forced to rely on custom applications that connect to specific data sources resulting in costly and rigid data access applications. Additionally, conventional data extraction methods create a feedback loop between the business users utilizing the data and information technology professionals (i.e. developers) facilitating the extraction of the data. The business users rely on the developers to extract the data into a format that is accessible and usable by the business user, and the developers rely on the business users to inform them on which data to extract. The delays inherent in such a feedback loop often impair the ability of business users to rapidly acquire, work with, and adjust the data and search queries needed to respond to changing conditions within the relevant environment.

As described herein, the Configurable Domain Manager Platform combines the functions of a Data Access Layer (DAL) and a Data Service Layer (DSL) to provide to a user, through a user interface, a simplified and standardized access to data stored in a variety of persistent storage formats.

In some embodiments, the Configurable Domain Manager Platform provides a business user ease of access to and use of data resources no matter the data access level knowledge of the user. This access changes the dynamics of the users in the data exploitation process by putting data directly into the hands of subject matter experts, taking out the unnecessary time and potential communication gaps with a separate entity (such as a developer, for example) and the subject matter expert who understands the business need associated with the data during data exploitation. Thus, the Configurable Domain Manager Platform enables a subject matter expert to effectively become a "developer" and produce on the level of what a web services expert may be able to create.

This quick access to the data allows for efficient use of data, which further provides the ability to utilize the data into business needs and also provides the ability for users to explore data, tests the various applications of the data and in some instances, fail quickly, allowing them to move on to other data and utilization of the data efficiently and inexpensively.

BRIEF DESCRIPTION OF THE DRAWINGS

Figure 1:
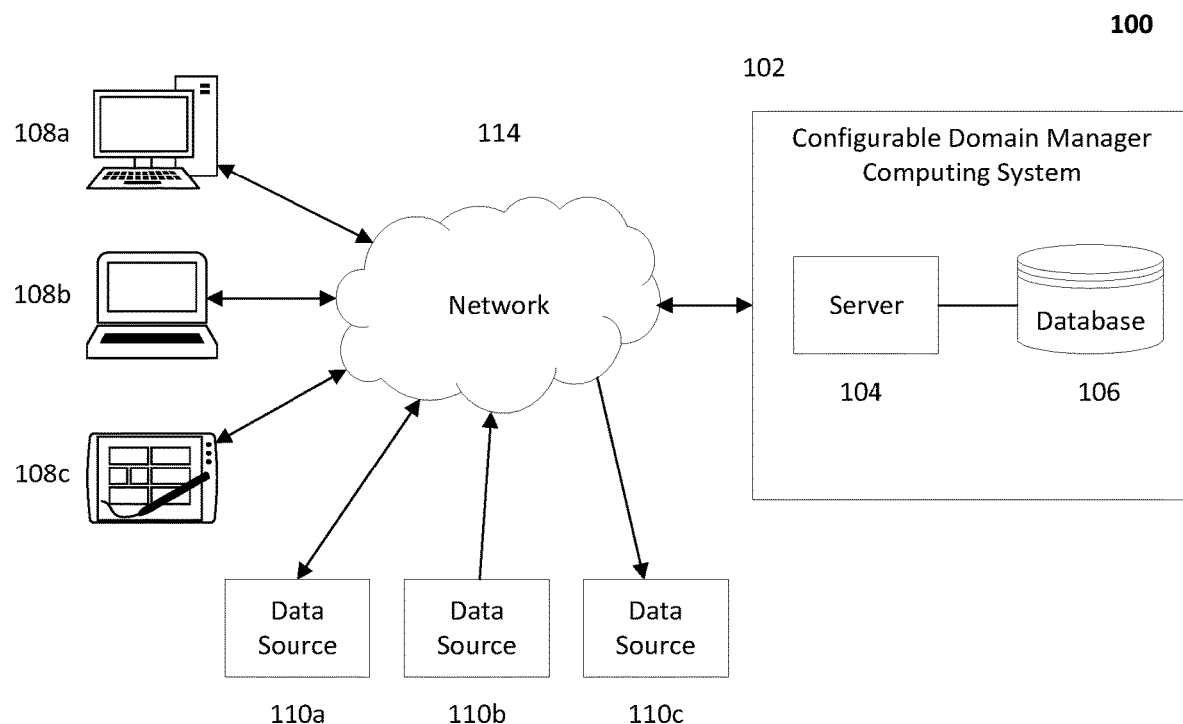
Figure 2:
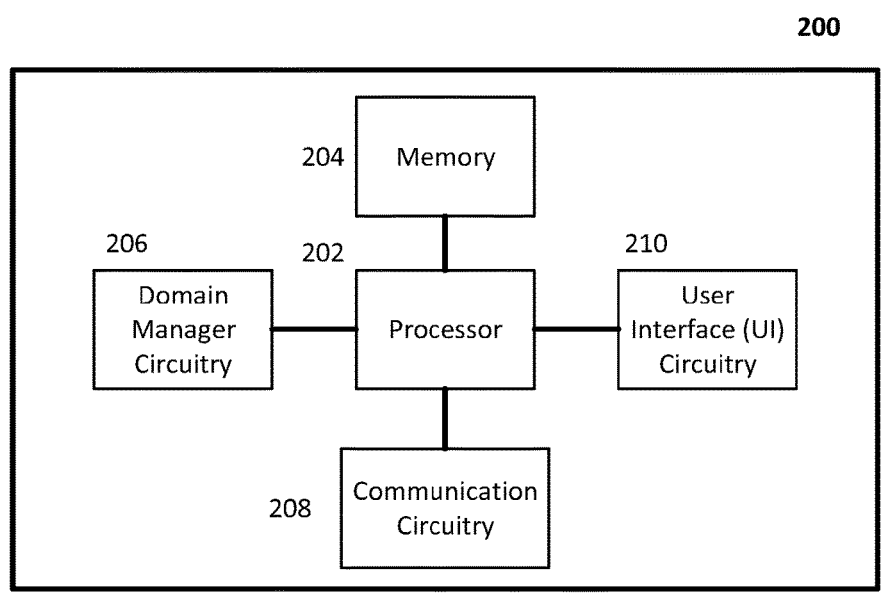
Figure 3:
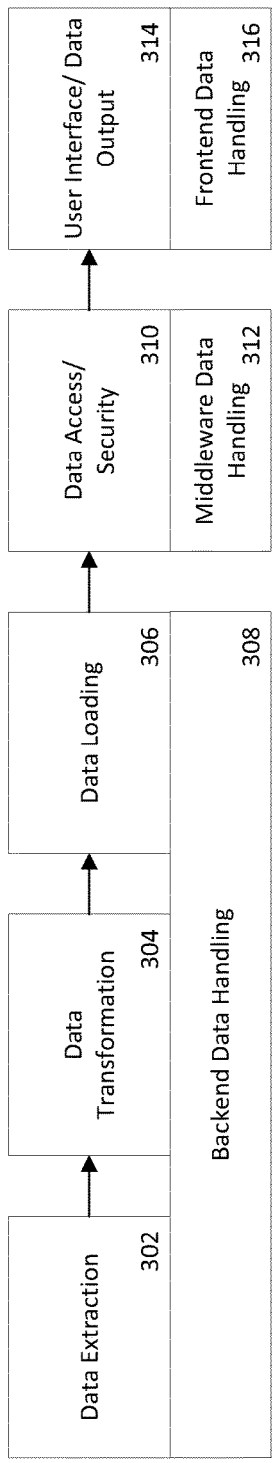
Figure 4:
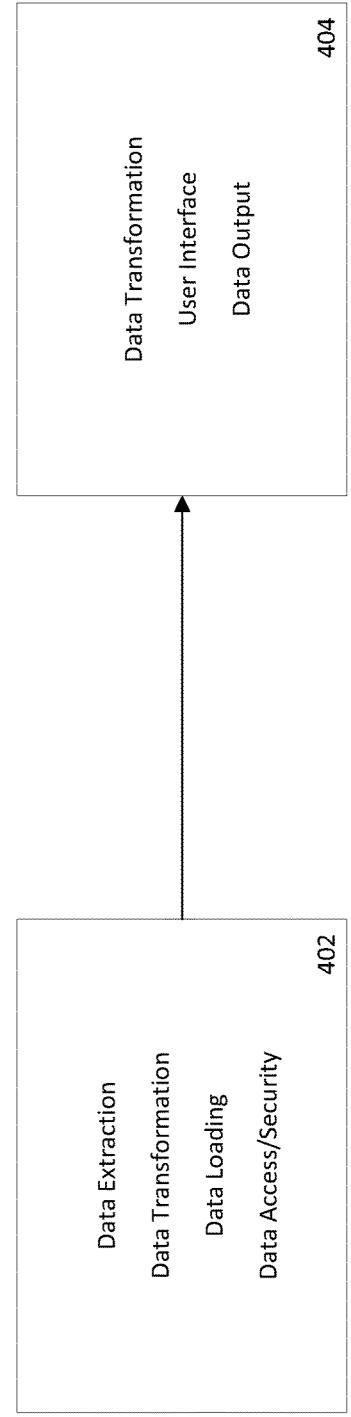

Having thus described certain example embodiments of the present disclosure in general terms, reference will now be made to the accompanying drawings, wherein:

FIG. 1 shows an example system diagram, in accordance with an example embodiment of the present invention;

FIG. 2 illustrates a schematic block diagram of circuitry used in association with a configurable domain manager computing device, in accordance with some example embodiments;

FIG. 3 illustrates a conventional block process for extracting and handling data from a data source;

FIG. 4 illustrates an example block process for extracting and handling data from a data source, in accordance with some example embodiments.

DETAILED DESCRIPTION

Various embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Therefore, any use of such terms should not be taken to limit the scope of embodiments of the present invention. Furthermore, it will appreciated that data sent to or received from computing devices described herein, may be sent or received directly from one computing device to another or may be sent or received indirectly utilizing network resources such as one or more servers, relays, routers, network access points, base stations, hosts, and/or the like, sometimes referred to herein as a "network."

As used herein, the term "container" or "data container" refers to a data structure forming a collection of other data containers or objects. In some instances, a container reflects a user-defined hierarchy. In some such instances, a root container contains one or more services, data source, and/or ACLs. In some such instances, a service container contains one or more different file types and/or other assets of a given service.

As used herein, the term "object" or "data object" refers to individual instances of data or data elements.

As used herein, the term "connector" or "adapter" refers to a pathway through which the configurable domain manager platform to connect to one or more disparate data sources.

System Architecture and Example Apparatus

Systems for a configurable domain manager may be embodied by any of a variety of devices. For example, an apparatus employed in an example embodiment may be embodied by a networked device, such as a server or other network entity, in communication with one or more devices, such as one or more client devices. Additionally or alternatively, the computing device may include fixed computing devices, such as a personal computer or a computer terminal. Other example embodiments may be embodied by any of a variety of mobile terminals, such as a portable digital assistant (PDA), a mobile telephone, smartphone, a laptop computer, a tablet computer, or any combination of the aforementioned devices.

As described herein, example embodiments of the configurable domain manager platform described herein solve technical challenges that are often present in conventional software development environments. In many such conventional environments, business process application developers necessarily seek to gain requirements from the process owners (who may be process domain experts) with the aim of acquiring from the process owner a description of the required technical interactions in terms that the developer could translate into a workable product. Given that the application developer often does not share that domain expertise in the business process management, there is often a disconnect between the perception of how these interactions affect the efficiency of the end product in meeting the expected goals. In contrast, example implementations of the configurable domain manager described herein, the act of designing and pseudo-developing the data artifacts of the required business process (such as models of domain-data-entities, or 'Data Models', for example) resides with the persons that have the requisite experience with the business process domain. This modeling and testing is eased through the use of the graphical tools and other aspects of the domain manager described herein. As a result, through the use of the domain manager platform described herein; these domain experts can articulate and also provide working examples of the business-process data objects that the applications developers can then form into the end product. Since these articulated objects are themselves working components of the end resulted application; there is little room for miscommunication of acceptance requirements.

In the context of running an enterprise IT environment, the users responsible for maintaining the IT environment are often required to have a deep understanding of the applications and/or other products being delivered to users, the projects that deliver and/or implement controlled changes, and the individual users who support the products and execute the changes. In many such environments, the processes associated with IT governance require iterative changes and frequent re-prioritization. In contrast to conventional systems, which often impose significant development delays and impose multiple barriers between subject matter experts and developers, the configurable domain manager platform described herein exhibits agility in declaring and consuming new relationships and attributes, as well as providing multi-faceted support for federated data capture aligned to those who are closest to the information needed.

In some embodiments, a configurable domain manager platform includes a combined data access layer (DAL) and data service layer (DSL) that is configured to provide simplified and standardized access to data stored in a variety of persistent storage formats. For example, the combined DAL and DSL of a configurable domain manager platform may be configured to access and interact with data stored in one or more formats, including those associated with SQL Server, Oracle, Excel files, SharePoint lists and/or document repositories, SQL Pivot, JSON, JIRA, and the like, for example, via a joiner connection, which allows a single configurable domain manager platform to access and use data from multiple disparate services and/or data sources.

As such, example embodiments of the configurable domain manager platform described herein overcome a number of the technical challenges present in conventional systems. For example, by lowering the barriers for entry to users seeking to rapidly interact with multiple data sources, inefficiencies associated with the typical software development life cycle are significantly reduced. Where the conventional software development process typically contemplates development efforts on at least three levels (namely, backend, middleware, and frontend, for example) example embodiments of the configurable domain manager platform described herein collapses those levels by at least simplifying the access to the relevant backend data, which allows clients and/or other users to develop software on all levels on the relevant stack concurrently.

In example implementations, that populate reporting data into templates, reports may be updated automatically, either on a predetermined time schedule, on demand, and/or as the underlying data changes. As such, the reporting processes associated with a given data set are improved, particularly in situations where conventional approaches require the manual entry of data into a spreadsheet or other form.

In many conventional environments, the specific, customized enterprise tools required in such environments often confine a user to a rigid system while requiring the user to have a deep understanding of the requirements of that system. To overcome the inefficiencies and technical barriers imposed by such conventional systems, example embodiments of the domain manager platform described herein provide a platform to host distinct services that don't relate to one specific use case. In such example implementations, services can be used by many applications to provide a common set of data to all applications while applications can create their own services for use with just that application. In some such example implementations, this capability also changes the dynamics of the relevant users in the data exporting process by putting data in the hands of subject matter experts, and thus eliminating the need to take unnecessary time and risk communication gaps where a separate individual is required to create a web service or other program interface to allow the subject matter expert (who may also understand the relevant business need) to access and use the data.

The domain manager platform described herein also tends to overcome technical challenges associated with conventional approaches by decreasing the time to market for software products and/or other activities that rely on access to disparate data sets, and providing enhanced scalability with reduced human capital constraints. Moreover, by allowing subject matter experts and other users to readily operate on and interact with disparate data sources, services and reporting functions can be combined, reporting protocols and queries can be tested in a "fail fast" and improved quickly without incurring multiple traditional development cycles, and input from subject matter experts associated with the relevant data can be rapidly incorporated and used without the potential for communications errors and/or other inefficiencies associated with traditional software development approaches.

In this regard, FIG. 1 discloses an example computing system within which embodiments described herein may operate. A user may access and modify data services (data sources) 110a-110c by a configurable domain manager computing system (CDMCS) 102 via a network 114, (e.g. the Internet, a local area network, etc.), utilizing user computing devices 108A through 108c, respectively.

The user computing devices 108A through 108c, may be embodied by any computing devices known in the art. For example, these devices may include desktop computers, laptop computers, smartphones, netbooks, tablet computers, wearable devices, and/or any combination of devices or entities adapted to perform the functions, operations, and/or processes described herein, and the electronic data may be provided using various transmission modes and/or protocols associated with these devices.

Additionally or alternatively, the data users, and other third parties may interact with the CDMCS 102 utilizing a web based interface via a web browser. In another example, the devices 108A-108C may include various hardware or firmware designed to interface with the CDMCS 102 (e.g., where an example device 108 is a purpose-built device offered for communicating with the CDMCS 102, such as a kiosk).

The CDMCS 102 may comprise a server 104 in communication with a database 106. The server 104 may be embodied as a computer or computers as known in the art. For example, server 104 may comprises an Internet Information Services (IIS) server. The server 104 may receive electronic data from various sources, including but not necessarily limited to the data sources 110A-110C, and may be operable to manage and configure data provided by these data sources. Data sources 110A-110C may include, but are not limited to data stored in a variety of persistent storage formats, including a Structured Query Language (SQL) Server, an Excel file, SharePoint Lists/Document Repositories, SQL Pivot, a JSON file and/or a JIRA server.

The database 106 may be embodied as a data storage device such as a Network Attached Storage (NAS) device or devices, or as a separate database server or servers. The database 106 includes information accessed and stored by the server 104 to facilitate the operations of the CDMCS 102. It will be appreciated that while CDMCS 102 is shown as involving a single server 104 and a single database 106, CDMCS may be configured to operate in a clustered environment, including but not limited to environments compatible with SQL Server and/or Redis technologies. In some such clustered environments, the CDMCS 102 may share services amongst and/or between multiple servers in a cluster such that each server in the cluster may be provide the same services.

Example Apparatus for Implementing Embodiments of the Present Invention

The server 104 may be embodied by one or more computing devices, such as apparatus 200 shown in FIG. 2. As illustrated in FIG. 2, the apparatus 200 may include a processor 202, a memory 204, domain manager circuitry 206, communication circuitry 208, and User Interface (UI) circuitry 210. Although these components 202-210 are described in part using functional terminology, it should be understood that implementation of the corresponding functions necessarily requires the use of particular hardware. It should also be understood that certain of these components 202-210 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus therefore includes particular hardware configured to perform the functions associated with the particular circuitry described herein.

While the term "circuitry" should be understood broadly to include hardware, in some embodiments it may also include software that configures operation of the hardware. In some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communication circuitry 208 may provide network interface functionality, and the like. It will also be appreciated that while FIG. 2 depicts a single device for the purposes of clarity, the apparatus shown in FIG. 2 may be incorporated into and/or distributed across a clustered environment.

The processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. Furthermore, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include user interface (UI) circuitry 210 that may, in turn, be in communication with processor 202 to provide a user interface to a user and, in some embodiments, to receive an indication of user input from the user interface. The UI circuitry 210 may comprise a user interface including a display and may comprise a web user interface displayed on a remote or user device, such as user devices 108a-10cc, a mobile application, a client device, a kiosk, or the like. In some embodiments, the UI circuitry 210 may also include circuitry to communicate with a keyboard, a mouse, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

In some examples, UI circuitry 210 may be configured to provide an easy to use networked user interface to the functions, services, and operations described herein. Thus, the UI circuitry is configured to create, format, filter, and modify metadata in the service containers described herein, allowing for a user to define data model abstraction.

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The domain manager circuitry 206 may be any means such as a device or circuitry embodied in either hardware or a combination of hardware and software that is configured to perform the corresponding functions of the components that are described herein.

For example, apparatus 200 includes means, such as domain manager circuitry 206 or the like, for performing root service commands received from UI circuitry 210 to retrieve content from the server 104 or database 106. The root service commands may be enabled on container resources. The root services commands may also comprise filterable output commands dependent on a virtual type of a container. For example the root service commands may comprise a default command which returns a data tree structure comprising child data objects representing the content from the server 104 or database 106. The root service command may also comprise a list command which returns a flattened array of data objects. The list command may be configured to filter the child data objects by the data container's virtual type. For example, the list command may be configured to filter the containers including the virtual type 'notifications,' which will return only 'notification' data resources.

In some examples, the root service commands begins the process for utilizing the configurable domain manager platform by the root platform for a user to begin initializing folders, containers, and service containers as described herein.

In another example, apparatus 200 includes means, such as domain manager circuitry 206 or the like, for creating and modifying folders in the database 106. In some examples, the folders may comprise generic containers, which are configured to hold other containers. Some example functions which may be accessed through the UE 108a-c, utilizing UI circuitry 210 may comprises root, which reads the content of the folder as an hierarchical data object, create, which creates a folder, update, which changes features of the folder such as the name, delete which deletes the folder, and read, which returns folder resources of specified types.

In some examples, a user creates one or more folders for each container service, datasource objects, or other desired organization needs. In some embodiments, UI circuitry 210 is configured to receive user input to create, read, update, and delete folders.

In another example, apparatus 200 includes means, such as domain manager circuitry 206 or the like, for providing access security to resources through access control to resources based on access control lists (ACLs) located in containers (folders). The ACLs may comprise a set of users or user groups mapped to a set of access permission lists. In some examples, a container will inherit the ACL of its parent container and can only add permissions. In some examples, access permission comprises a pair of a resource class and an access value. In some embodiments, the resource classes may comprise three classes: data class, server content class, and administration class. The resource classes may comprise separate access control for each of the three resource classes. For example, data class may provide levels of access which correspond to typical data operations such as "create", "read", "update", and "delete" at the data level. Server content class may provide controlling access to server objects such as service containers, folders, other containers, etc. Administration class may provide control access management, allowing the user to update the access control of any part of the system.

In another example, apparatus 200 includes means, such as domain manager circuitry 206 or the like, for user access to configurable datasource objects, which in turn allow connection to a variety of data sources, such as data sources 110a-110c. Domain manager circuitry 206 may further include means to create, read, update, and delete (CRUD) datasource objects. In some examples, the datasource objects may be provided in JavaScript Object Notation (JSON) format. Domain manager circuitry 206 may also be configured to test and validate SQL objects against a datasource object. The domain manager circuitry 206 may also be configured to output the datasource information to a user in a user interface. In some examples, Domain manager circuitry 206 is configured to utilize a JavaScript Library, including code to automatically provide authorization, configuration, datasource configuration, datasource CRUD operations, and other utilities to enable the services of the CDMCS 102 and domain manger circuitry 206.

One of the approaches that domain manager circuitry 206 may use to facilitate the acquisition and use of data from multiple disparate datasource objects involves the use of a join connector, which connects the apparatus 200 in general, and the domain manager circuitry 206 in particular, to multiple services and/or datasource objects. For example, in one example implementation, a join connector provides an interface between the domain manager circuitry 206 and multiple disparate sources of data, such as datasource objects associated with a SharePoint environment, a Google-based environment, and a SQL Server environment, for example. Through the use of the join connector, individual data elements may be pulled from each of the disparate data sources, such that the apparatus and/or a service interfacing with the domain manager circuitry 206 to run calculations, perform changes, and/or otherwise operate on the data pulled from each of the disparate data sources without requiring a separate interface with each data source. In some such example implementations, the join connector may be configured with a memory cache, such that upon pulling in multiple datasource objects and/or other sets of data, multiple queries using that data can be run without requiring multiple interactions with the underlying data sources.

The use of a join connector provides at least one pathway for the domain manager platform disclosed herein to overcome technical challenges associated with conventional approaches. Where conventional techniques to interfacing with multiple data sources may require multiple extract-transform-load (ETL) operations to be coded and deployed by a developer (often at the cost of weeks of time and significant monetary expenditure), the join connector and its interaction with the domain manager platform allows for adjustments to a query and other data operations to be performed in minutes, directly from an interface (such as that associated with interface circuitry 210, for example) associated with the domain manager platform.

In some embodiments, UI circuitry 210 is configured to receive user input to define a datasource object.

In another example, apparatus 200 includes means, such as domain manager circuitry 206 or the like, for creating a service container which comprises all of the data assets of a service For example, the data assets may comprise a service view, a service contract, service query container, custom metadata, service templates, etc.

In some examples, a user may create a service container by submitting a data search query such as a Structured Query Language (SQL) select statement. In some examples, the SQL select statement can be input directly by a user, such a user familiar with SQL formatting. In another example, UI circuitry 206 is configured to output a user interface element comprising several selectable factors representing the available data fields to construct the SQL query. For example, a user may be able to select the factors relating to their desired SQL query by dragging and dropping selectable factors displayed in a user interface into a statement input portion of the user interface.

The domain manager circuitry 206 then processes the statement and creates an endpoint, such as a RESTful endpoint, that supports a set of data operations. The domain manager circuitry 206 then assigns a Uniform Resource Locator (URL) to the created endpoint. In some examples, this URL is a virtual path that combines a base URL, full path to the folder that contains the server, and the service container name given at creation. The service container may comprise a SQL command (the SQL select statement) and a configurable list of fields gathered from a user (i.e. metadata and user accessible fields, etc.) through UI circuitry 210. The use of a service container allows a user to rename columns without losing metadata by changing the column name on an attribute of each type in a given model and observing that none of the metadata attributes are lost.

Another endpoint that example implementations of the domain manager circuitry 206 may create is an authentication endpoint. The domain manager circuitry 206 may allow for users to be authenticated from a number of sources. For example, if a given user is authenticated as an anonymous user, the user may be provided with limited access to limited data sets and/or other aspects, based on an access control list and/or other protocols. Similarly, if a particular user is authenticated through another protocol, such as a two-factor authentication protocol, network or workstation login, Windows authentication, and/or the like, the user may be granted access based on the authenticated identity of the user.

It will be appreciated that additional efficiencies may be realized in example implementations of the domain manager platform by allowing the domain manager circuitry 206 and/or other aspect of the domain manager platform to consolidate access control functions for multiple data sources. For example, by maintain an access control list and/or otherwise acting as a centralized access control portal, the domain manager platform can be used to provide a single point where a user may be authenticated, and the domain manager platform may interact with the relevant data sources, other services, and/or other systems to facilitate access by the user to all of the resources to which the user is permitted to access.

In another example, apparatus 200 includes means, such as domain manager circuitry 206 or the like, for executing service containers data verbs to return data from the service container, which in some examples includes returning the data in JSON format. Examples of the data verbs include read, add, edit, delete, XLS import, XLSX export, XML export, and read metadata. The read data verb reads and returns service container content. In some examples, the returned content includes up to 5000 rows in JSON format. The add data verb adds rows to the service container data. The edit data verb edits a service data row. The delete data verb deletes a service data row. The XLS import data verb imports data rows from an inputted Excel Binary File Format (XLS) file. The XLSX export data verb exports service data rows to an Excel Microsoft Office Open XML Format Spreadsheet (XLSX) file. The XML export data verb exports service data rows to an extensible Markup Language (XML) format. The read metadata reads and outputs metadata associated with service to the user. The Odata data verb may also be used in connection with example implementations of the domain manager circuitry 206. It will also be appreciated that while many of the example described herein contemplate use of JSON and JSON format, some example embodiments may be implemented to work with compressed JSON protocols.

In another example, apparatus 200 includes means, such as domain manager circuitry 206 or the like, for creating a service query container comprising the assets of a query container. For example, the service query container may comprise, the SQL object service snippets and other parts of a query to the data sources. The Domain manager circuitry 206 may be configured to execute reads/returns commands on service query container content as a hierarchical JSON. The service query container may also comprise a fields object, wherein the fields object defines service data field metadata. Domain manager circuitry 206 may be configured to read and return service metadata content in JSON format. Domain manager circuitry 206 may be also be configured to update the service fields object. Domain manager circuitry 206 may also be further configured to add custom metadata property to all service fields. Domain manager circuitry 206 may be further configured to remove a custom metadata property from all service fields.

In some examples, the service containers allow 'parameters' operation. In some examples, domain manager circuitry 206 supports MS SQL style parameter notation. For example, the user, through a "Parameters" module through UI circuitry 210, can convert query literals to parameters, specify parameter names, filter parts of the SQL select statement, and/or set default values for parameters. In some example implementations, one or more parameters may have a default value, such that if a given query omits a value for a given parameter, a default value is supplied. For example, if a year or other time parameter is not supplied with a given query, the default parameter (which may be for example, all years and/or the current year, or another value) may be automatically supplied. By using default parameters, users who are unfamiliar with the structure and format of an underlying data source may use streamlined queries with a reduced risk that the omission of an unknown parameter skewed and/or otherwise occluded potentially important data. Moreover, in some example implementations, server-defined parameters may be used. For example, a server through which a user accesses one or more data sources and/or otherwise interacts with the domain manager platform may capture parameters such as a user identifier, a domain and/or username associated with a user, a group of domains associated with the user, and/or a timestamp associated with one or more actions performed by a user. In some such example implementations, upon a given user's modification and/or other action upon a data element, the server-defined parameters may be used to capture and store who performed the given operation, what the operation entailed, and when the operation was performed.

In some examples, domain manager circuitry 206 is configured to send multiple values for a parameter. For example in logical operations, domain manager circuitry 206 may change the "WHERE" clause in a given parameter such that values of the parameter will be used in an "OR" context.

Domain manager circuitry 206 in conjunction with UI circuitry 210, may be further configured to read and return parameters in JSON format and update the parameter collection. In another example, apparatus 200 includes means, such as domain manager circuitry 206 or the like, for creating an SQL object containing the SQL select statement submitted by the user in the creation of the service container described above. Domain manager circuitry 206 may be also configured to read and return the SQL select statement stored in the SQL object as text. Domain manager circuitry 206 may be configured to read and return the compiled SQL as executed by the CDMCS 102 as text. Domain manager circuitry 206 may be also configured to update the SQL object. For example, the SQL object may be updated with any user modifications. The domain manager circuitry 206 may then update the SQL select statement.

In another example, apparatus 200 includes means, such as domain manager circuitry 206 or the like, for providing a Query PreQuery object to store Transact SQL queries to be run prior to execution of service SQL. For example, a query prequery object may be configured to determine which information is available to a user prior to the execution of the service SQL select statement. In some examples, domain manager circuitry 206 is configured to read and returns the prequery object as string. In some examples, domain manager circuitry 206 is further configured to creates or set a prequery object. In some examples, domain manager circuitry 206 is further configured to update the prequery object. In some examples, domain manager circuitry 206 is further configured to deletes the prequery object.

In another example, apparatus 200 includes means, such as domain manager circuitry 206 or the like, for providing a query snippet object to store Transact SQL code snippets to be executed against the service container. In some examples, query snippets may be stored and reused by multiple users in the construction of multiple SQL queries. Domain manager circuitry 206 may be further configured to read and return SQL snippets as a hierarchical JSON object, a list, and/or text. Domain manager circuitry 206 may be further configured to create a snippet as an object in the service container. Domain manager circuitry 206 may be further configured to update, delete, and/or read and return the snippet object.

In another example, apparatus 200 includes means, such as domain manager circuitry 206 or the like, for creating contract objects, which provide customizable service validation for quality assurance and data integrity tests. Domain manager circuitry 206 may be further configured to read and return contract objects in a hierarchical JSON format. Domain manager circuitry 206 may be further configured to create, update, and delete contract objects in a service container. Domain manager circuitry 206 may be further configured to validate the service container against the contract object and read and return information about the contract object. For example, the contract object may validate the service container by determining if the data source continues to contain the data and data formats defined in the contract object.

In another example, apparatus 200 includes means, such as domain manager circuitry 206 and UI circuitry 210 or the like, for creating service view objects which allow customized configuration of service container data returned into views. For example, a user may further filter and select certain fields of the data for service views in the service containers. Domain manager circuitry 206 may be further configured to read and return service view objects in a hierarchical JSON format, a views content list, and/or an object content. Domain manager circuitry 206 may be further configured to create, update, and delete service view objects in a service container. Domain manager circuitry 206 may be further configured to generate a URL for a view represented by the service view data object and return a structured data feed such as an OData v2 feed utilizing AtomPub. Domain manager circuitry 206 may be further configured to read and return information about the service view object.

In another example, apparatus 200 includes means, such as domain manager circuitry 206 and UI circuitry 210 or the like, for creating a service notification object for publication to notification services. In some examples, this provides a user the ability to easily perform mail-merge operations with the data output from a model or service container. A user, in some examples, uses a "Notifications" module of the UI which allows a user to navigate into the components of the service container. The user is then able to easily create or edit a notification utilizing the user interface, such as by clicking on the user interface options. In some examples, notification publishing takes the contents of the notification and fills in data on JSON contents and returns an array of JSON objects for each of the data items of a service container. Domain manager circuitry 206 may be further configured to read and return service notification objects as a hierarchical JSON and/or a service notification content list. Domain manager circuitry 206 may be further configured to create, update, and delete service notification objects in a service container. Domain manager circuitry 206 may be further configured to publish the service notification object to a publication service. Domain manager circuitry 206 may be further configured to read and return information about the service view object.

In another example, apparatus 200 includes means, such as domain manager circuitry 206 and UI circuitry 210 or the like, for providing a service template object to allow saving of Xlsx templates. In some examples, the service template comprises a header row and a data row. In some examples, downloading the default template to the CDMCS 102 provides an example of the base template to a user. In some examples, the service container is configured to output the data from the data source utilizing a stored template.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or combinations of software and hardware. Furthermore, embodiments may take the form of a computer program product stored on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Turning now to FIG. 3, FIG. 3 illustrates a conventional block process for extracting and handling data from a data source. For example, the development process is made up of three levels: backend data handling 308, middleware data handling 312, and frontend data handling 316. The backend data handling process may include data extraction 302, data transformation 304, and data loading 306. The middleware data handling processes 312 may comprise providing data access and security 310. The frontend data handling processes 316 may comprise user interface/data output 314. Each of these separate processes require specific customized enterprise tools, each of which in turn require development from human developers. The multiple people and processes in involved create a data feedback loop, causing delays in the business process and use of the data. This system architecture, in turn requires a user to be confined by the rigidity of the system (and understand the requirements of that system). Changing just one component of FIG. 3 would require time and resources to develop and implement the change. Thus the time between data extraction 302 and data output 314 may result in stale or less useful data results.

FIG. 4 illustrates an example block process for extracting and handling data from a data source, in accordance with some example embodiments. As shown in FIG. 4, the data handling processes are condensed, such that data extraction, data transformation, data loading and data access/security processes 402 are accomplished by one entity such as domain manager circuitry 206 in CDMCS 102 and the data transformation, user interface, and data output processes 404 are accomplished by one entity such as UI circuitry 210 in CDMCS 102. This combination of the processes and simplifying the access to the data on the backend allows clients to develop on all levels on the stack concurrently. For example, a user may utilize a user interface once and extract the data stored in the data source, without the need for intermediate development from developers.

In some examples, the CDMCS 102 provides the platform to host distinct services that may not relate to one specific use case. This allows a user to interact with multiple data sources in many different ways.

In some examples, the combination of the processes shown in FIG. 4, improves the reporting processes of data, since a user is not required to manually input data into a spreadsheet. Instead, CDMCS 102 is configured to populate the data into a template and reports update automatically. Thus users get access to the most updated data and reduces errors in data input since the time between data extraction and data output is greatly reduced.

Operations of an apparatus, method, and computer program product according to example embodiments of the invention are described above. It will be understood that each of the operation described above, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

In some embodiments, certain ones of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for domain management in a network environment, the system compromising:
   domain management circuitry;
   user interface circuitry independent from said domain management circuitry;
   wherein the domain management circuitry and the user interface circuitry are configured to interact together as a combined data access layer and data service layer;
   wherein the domain management circuitry and the user interface circuitry are configured to interface directly with a first data source and a second data source, wherein the first data source comprises a first set of data stored in a first persistent format and wherein the second data source comprises a second set of data stored in a second persistent format;
   wherein said domain management circuitry is configured to perform one or more data transformation operations on said first set of data and said second set of data; and
   wherein said system is configured to create a business data object with data acquired from said first data source and said second data source without a pre-defined metadata model of said business data object.

2. The system of claim 1, wherein the domain management circuitry is further configured to perform:
   one or more data extraction operations from the first data source and the second data source; and
   one or more data loading operations with the first data source and the second data source.

3. The system of claim 2, wherein the domain management circuitry is further configured to perform a data security operation.

4. The system of claim 2, wherein the user interface circuitry is further configured to:
   perform one or more data transformation operations on the first set of data and the second set of data;
   receive an input from a user; and
   output one or more data elements from the first set of data and the second set of data.

5. The system of claim 3, wherein the first persistent format and the second persistent format are different formats.

6. The system of claim 5, wherein the first persistent format is a format associated with a structured query language (SQL) server, an Excel file, a SharePoint Repository, a JSON file, or a JIRA server.

7. The system of claim 5 wherein the second persistent format is a format associated with a structured query language (SQL) server, an Excel file, a SharePoint Repository, a JSON file, or a JIRA server.

8. The system of claim 5, wherein the domain management circuitry is configured to perform one or more root service commands received directly from the user interface circuitry.

9. An apparatus for domain management in a network environment, the apparatus comprising:
   domain management circuitry;
   user interface circuitry independent from said domain management circuitry;
   wherein the domain management circuitry and the user interface circuitry are configured to interact together as a combined data access layer and data service layer;
   wherein the domain management circuitry and the user interface circuitry are configured to interface directly with a first data source and a second data source, wherein the first data source comprises a first set of data stored in a first persistent format and wherein the second data source comprises a second set of data stored in a second persistent format;
   wherein said domain management circuitry is configured to perform one or more data transformation operations on said first set of data and said second set of data; and
   wherein said system is configured to create a business data object with data acquired from said first data source and said second data source without a pre-defined metadata model of said business data object.

10. The apparatus of claim 9, wherein the domain management circuitry is further configured to perform:
    one or more data extraction operations from the first data source and the second data source; and
    one or more data loading operations with the first data source and the second data source.

11. The apparatus of claim 10, wherein the domain management circuitry is further configured to perform a data security operation.

12. The apparatus of claim 10, wherein the user interface circuitry is further configured to:
    perform one or more data transformation operations on the first set of data and the second set of data;
    receive an input from a user; and
    output one or more data elements from the first set of data and the second set of data.

13. The apparatus of claim 11, wherein the first persistent format and the second persistent format are different formats.

14. The apparatus of claim 13, wherein the first persistent format is a format associated with a structured query language (SQL) server, an Excel file, a SharePoint Repository, a JSON file, or a JIRA server.

15. The apparatus of claim 13 wherein the second persistent format is a format associated with a structured query language (SQL) server, an Excel file, a SharePoint Repository, a JSON file, or a JIRA server.

16. The apparatus of claim 11, wherein the domain management circuitry is configured to perform one or more root service commands received directly from the user interface circuitry.

17. A method for domain management, the method comprising:
    providing domain management circuitry and user interface circuitry, where said user interface circuitry is independent from said domain management circuitry;
    directly receiving at said domain management circuitry, a root service command transmitted by said user interface circuitry;
    wherein the domain management circuitry and the user interface circuitry are configured to interface directly with a first data source and a second data source, wherein the first data source comprises a first set of data stored in a first persistent format and wherein the second data source comprises a second set of data stored in a second persistent format;

wherein said domain management circuitry is configured to perform one or more data transformation operations on said first set of data and said second set of data; and wherein said domain management circuitry and said user interface circuitry are configured to create a business data object with data from said first data source and said second data source without a predefined metadata model of said business data object.

18. The method of claim 17, wherein the first persistent format and the second persistent format are different formats.

19. The method of claim 18, wherein the first persistent format is a format associated with a structured query language (SQL) server, an Excel file, a SharePoint Repository, a JSON file, or a JIRA server.

20. The method of claim 18, wherein the second persistent format is a format associated with a structured query language (SQL) server, an Excel file, a SharePoint Repository, a JSON file, or a JIRA server.

* * * * *